United States Patent
Crass

(10) Patent No.: US 6,297,615 B1
(45) Date of Patent: Oct. 2, 2001

(54) BATTERY PACK AND OVER-VOLTAGE ALARM THEREFOR

(75) Inventor: Matthew M. Crass, Pleasant Prairie, WI (US)

(73) Assignee: Snap-on Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/578,094

(22) Filed: May 25, 2000

Related U.S. Application Data

(60) Provisional application No. 60/138,313, filed on Jun. 9, 1999.

(51) Int. Cl.[7] .................................. H02J 7/00; H01M 10/44
(52) U.S. Cl. ........................ 320/112; 320/134; 320/162; 320/DIG. 19
(58) Field of Search ................................. 320/112, 134, 320/162, DIG. 18, DIG. 19; 340/636

(56) References Cited

U.S. PATENT DOCUMENTS

| | | |
|---|---|---|
| 3,579,050 | 5/1971 | Basu et al. . |
| 3,820,099 * | 6/1974 | Vogt ........................... 340/636 |
| 4,308,492 | 12/1981 | Mori et al. . |
| 4,441,066 | 4/1984 | Burmenko . |
| 4,559,497 | 12/1985 | Farrugia . |
| 4,609,914 | 9/1986 | Fathi . |
| 4,658,199 | 4/1987 | Hoffman . |
| 5,159,272 | 10/1992 | Rao et al. . |
| 5,184,109 | 2/1993 | Tanaka et al. . |
| 5,549,984 | 8/1996 | Dougherty . |
| 5,637,413 | 6/1997 | Fernandez et al. . |
| 5,695,886 | 12/1997 | Dewan et al. . |
| 6,008,627 * | 12/1999 | Narita ........................... 320/134 |

* cited by examiner

Primary Examiner—Gregory J. Toatley, Jr.
(74) Attorney, Agent, or Firm—Seyfarth Shaw

(57) ABSTRACT

A battery pack has a pair of input/output terminals adapted to be connected across a source of charging voltage, and a lead-acid battery connected across the input/output terminals. A Zener diode is connected in series with a resistance across the input/output terminals, the resistance forming part of a trigger circuit for triggering an alarm signal to actuate a visible and/or audible annunciator when the charging voltage exceeds a threshold level. In one embodiment the trigger circuit is an IC comparator having one input connected to a reference voltage drive from a voltage divider connected across the input/output terminals, and the other input connected to the trigger voltage across the resistance in series with the Zener. In another embodiment the trigger circuit includes a pair of transistors, one being turned ON by the trigger voltage and in turn ON the second transistor to produce the output signal and provide a feedback to latch on the first transistor.

3 Claims, 1 Drawing Sheet

BATTERY PACK AND OVER-VOLTAGE ALARM THEREFOR

RELATED APPLICATION

This application claims the benefit of copending U.S. provisional application No. 60/138,313, filed Jun. 9, 1999.

BACKGROUND

This application relates to battery packs of the rechargeable type, and in particular to protection of such battery packs during recharging. The application relates in particular to battery packs of the lead-acid cell type.

It is known to provide battery packs, i.e., compact arrangements of one or more battery cells, for various DC power delivery applications. Such battery packs are, for example, commonly used for powering cordless power tools. In recent years battery packs have also been provided for use in jump-starting automotive vehicles. The battery cells of battery packs are typically rechargeable. NiCad battery cells are commonly used for cordless power tool battery packs. More recently lead-acid battery cells have been utilized in battery packs for both cordless power tools and for jump-starting automotive vehicles. Such lead-acid battery cells are sold, for example, by Johnson Controls under the designation "Inspira."

There are various methods of recharging a thin metal film, lead-acid battery pack. The quickest method, and the preferred method for battery packs used for jump-starting automotive vehicles, is to simply leave the battery pack connected to the charging system of the automotive vehicle after the vehicle engine is started and running. This technique can recharge a lead-acid battery pack in a few minutes. However, care must be taken to avoid overcharging lead-acid battery cells, since this can cause overheating and rupture of such cells. Overcharging can result from an over-voltage condition, which could exist if the battery pack is being charged by the charging system of a running automobile engine, the charge regulation system of which has failed. This overcharge danger is normally not presented if slow-rate recharging techniques are used.

SUMMARY

There is disclosed an improved battery pack arrangement of the rechargeable type, which avoids the disadvantages of prior battery packs while affording additional structural and operating advantages.

An important feature is that the arrangement has built-in overcharge protection.

In connection with the foregoing feature, another feature is that the arrangement includes alarm circuitry for signaling a recharge over-voltage condition.

Still another feature is the provision of a method of recharging a lead-acid battery pack from the charging system of a running automotive vehicle while avoiding overcharge conditions.

BRIEF DESCRIPTION OF THE DRAWINGS

For the purpose of facilitating an understanding of the subject matter sought to be protected, there are illustrated in the accompanying drawings preferred embodiments thereof, from an inspection of which, when considered in connection with the following description, the subject matter sought to be protected, its construction and operation, and many of its advantages should be readily understood and appreciated.

DETAILED DESCRIPTION

Figure 1:
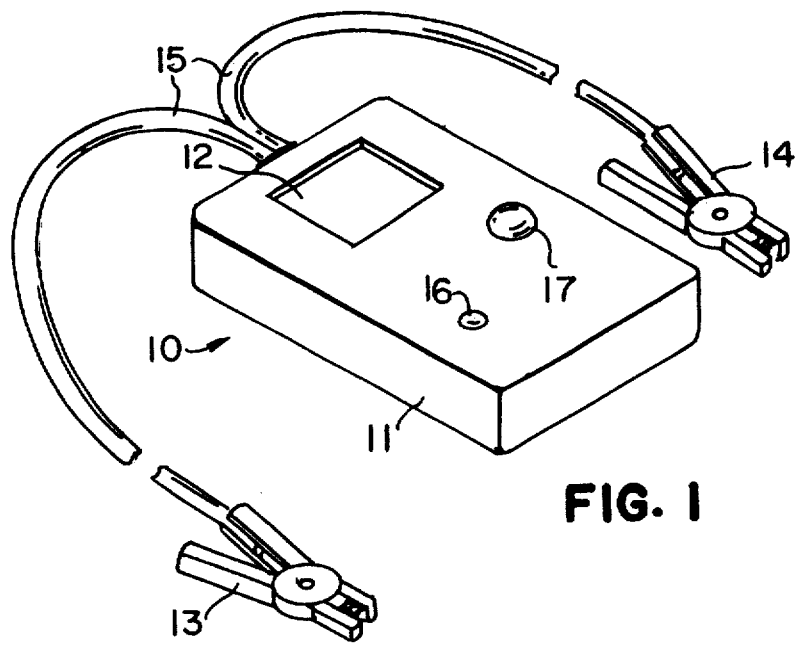
FIG. 1 is a perspective view of a rechargeable battery pack.

Referring to FIG. 1 there is illustrated a rechargeable battery pack generally designated by the numeral 10, which is preferably of the lead-acid type, including one or more lead-acid, thin metal film cells, designed to generate a no-load DC output voltage of approximately 12.8 volts, when fully charged. The battery pack 10 has a housing 11 which encloses the battery cells and associated circuitry, and may be provided with a display 12, which could be of any of a number of various types, for displaying various conditions of the battery pack, including output voltage, state-of-charge level and the like. The battery pack 10 includes a pair of clamps 13 and 14 of the standard jumper type, adapted to be respectively connected to the terminals of an automotive battery. The clamps 13 and 14 are, respectively, connected to the terminals of the battery cells B (see FIG. 2) in the housing 11 and to the associated circuitry therein by a pair of cables 15. The housing 11 may also be provided with a visible annunciator, such as an LED 16, and/or a suitable audible annunciator 17, such as buzzer, beeper, or the like. If desired, the battery pack 10 could also be provided with suitable control switches and the like.

In use, the battery pack 10 may be connected to the terminals of an automotive battery by means of the clamps 13 and 14 for connecting the battery pack in parallel with a discharged automotive battery to start the engine of the associated vehicle. This jump-starting operation can reduce the state-of-charge level of the battery pack 10 and, since it is important to avoid deep discharge of lead-acid cells to maximize cell life and prevent permanent cell damage, it is recommended that the battery pack 10 be immediately restored to a full-charge level by leaving it connected to the battery of the running vehicle engine to be recharged by the vehicle charging system. The display 12 may indicate when the battery pack 10 has been restored to full charge.

Figure 2:
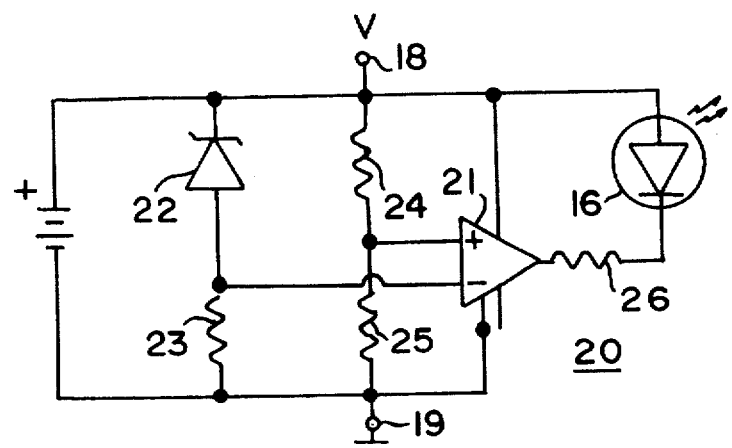
FIG. 2 is a schematic circuit diagram of an alarm circuit included in the battery pack of FIG. 1, in accordance with a first embodiment.

Referring now to FIG. 2, there is illustrated an alarm circuit 20, in accordance with a first embodiment, which may be included in the battery pack 10 to signal the presence of a dangerous over-voltage condition during the battery pack recharge operation. The circuit 20 has input/output terminals 18, 19, respectively connected to the anode and cathode of the battery B and to the cables 15 for connection, respectively to the V+ supply and ground terminals of the vehicle battery charging system. The alarm circuit 20 includes a trigger circuit in the form of an IC comparator 21, which may be an LM 311. A threshold voltage level is established by a Zener diode 22, the cathode of which is connected to the V+ supply (the anodes of the battery pack battery B and of the vehicle battery), and the anode of which is connected through a resistor 23 to ground (the cathodes of the battery pack battery B and of the vehicle battery). It will be appreciated that the V+ supply voltage is charging voltage being provided to the vehicle battery (and to the parallel-connected battery pack battery B) by the vehicle charging system (alternator or generator). The anode of the Zener diode 22 is connected to the inverting input terminal of the comparator 21. Resistors 24 and 25 form a voltage divider connected across the V+ supply, the voltage across the resistor 25 being connected to the non-inverting input terminal of the comparator 21. The power terminals of the comparator 21 are also connected across the V+ supply and the output of the comparator 21 is connected through a resistor 26 to the cathode of the LED 16, the anode of which is connected to the V+ supply. The resistors 23–25 and the comparator 21 cooperate to form a trigger circuit.

In operation, if the charging V+ supply voltage exceeds the threshold level established by the Zener diode, which may, e.g., be about 15 volts, the Zener diode 22 conducts and voltage begins to develop across the resistor 23. When that voltage exceeds the voltage across the resistor 25 (preferably only a few tenths of a volt) the comparator 21 produces an output signal which lights the LED 16, to provide a visible alarm signal to the operator that a dangerous over-voltage condition exists, and that the battery pack 10 should be disconnected to avoid damage. It will be appreciated that, alternatively, the output of the comparator 21 could be connected to the audible annunciator 17, or to both visible and audible annunciators.

Figure 3:
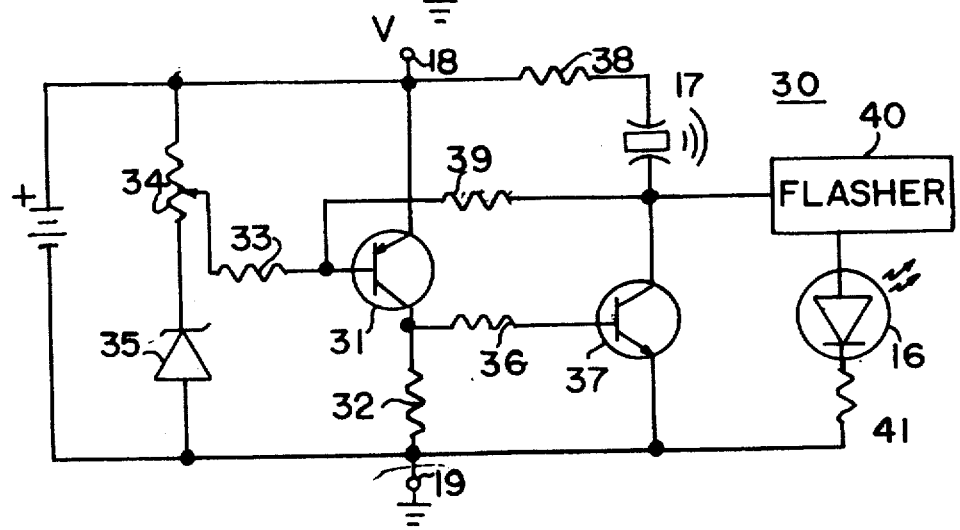
FIG. 3 is a schematic circuit diagram of an alternative form of alarm circuit.

While the alarm circuit 20 works well, it does draw a significant current (tens to hundreds of microamperes), since the comparator 21 is always connected across the terminals of the battery pack battery B. This small current drain can discharge the battery B over time. Accordingly, referring to FIG. 3, there is provided an alternative alarm circuit 30, which has negligible current draw when not in use. The circuit 30 includes a transistor 31, which may be a 2N3906, the emitter of which is connected to the V+ supply and the collector of which is connected to ground through a current-limiting resistor 32. The base of the transistor 31 is connected through a resistor 33 to the wiper of a potentiometer 34, which is connected in series with a Zener diode 35 across the V+ supply, the anode of the Zener diode 35 being connected to ground. The collector of the transistor 31 is also connected through a resistor 36 to the base of a transistor 37, which may be a 2N3904. The emitter of the transistor 37 is connected to ground, while its collector is connected through the audible annunciator 17 and a resistor 38 to the V+ supply. The collector of the transistor 37 is also connected through a feedback resistor 39 to the base of the transistor 31. The output of the circuit 30 at the collector of the transistor 37 may also be connected to the anode of the LED 16, as through an optional flasher circuit 40, the cathode of the LED 16 being connected to ground through a resistor 41. The potentiometer 34, the resistors 32, 33, 36 and 39 and the transistors 31 and 37 cooperate to form a trigger circuit.

Under normal, non-charging conditions, the voltage of the battery pack battery B will be between 12.8 volts and 13.1 volts, well below the voltage rating of the Zener diode 35, which is preferably 15.0 volts ±5%. In this normal, at rest condition, the total current draw of the circuit is approximately 10 nA. ($10 \times 10^{-9}$ amperes).

When the battery B is being charged, its voltage will rise above 13.1 volts. If the charging method is applying an inappropriately high charging voltage, the battery's voltage could rise above 16.5 volts, which could lead to battery overheating and failure. As the battery voltage exceeds the threshold voltage of the Zener diode 35, the excess voltage will develop across the potentiometer 34. This potentiometer is adjusted such that transistor 31 will turn ON if the battery voltage exceeds 16.5 volts. When the voltage at the wiper of the potentiometer 34 exceeds the threshold value of the transistor 31, typically about 0.7 volts, the base-emitter junction of the transistor 31 conducts through the resistor 33 as a current limiter, causing the collector-emitter junction to conduct.

With transistor 31 ON, current flows through the resistor 32, bringing the collector of the transistor 31 from zero volts towards V+. When the voltage across the resistor 32 exceeds the threshold value of the transistor 37, its base-emitter junction conducts through the resistor 36 as a current limiter, turning ON the transistor 37. With the transistor 37 ON, current flows through the audible annunciator 17 and the current-limiting resistor 38, causing the audible annunciator 17 to emit a warning tone. Conduction of the base-emitter junction of the transistor 37 also provides positive feedback to the base of the transistor 31 through the resistor 39, forcing the transistor 31 into full conduction or saturation. This prevents a condition wherein the volume of the audible annunciator 17 transitions through a gradually increasing volume as the battery voltage transfers from below 16.5 volts to above 16.5 volts.

Once the voltage at the wiper of the potentiometer 34 falls below the threshold voltage of the transistor 31, the feedback through the resistor 39 cannot sustain the transistor 31 ON, and the entire circuit turns OFF.

The output of the alarm circuit at the collector of the transistor 37 is also connected through an optional flasher 40 to the anode of the visible annunciator 16, the cathode of which is connected to ground through a resistor 41. Thus, it will be appreciated that this circuit produces both visible and audible alarms of an over-voltage condition. It will be appreciated that either of the circuits 20 or 30 could utilize only a single one of the annunciators 16 and 17, or both annunciators. Also, it will be appreciated that other alternative annunciator arrangements could be utilized in either of the circuits 20 and 30.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicant's contribution. The actual scope of the protection sought is intended to be defined in the following claims when viewed in their proper perspective based on the prior art.

I claim:

1. A battery pack comprising:

a housing;

a pair of input/output terminals coupled to the housing and adapted to be connected across a source of charging voltage;

a lead-acid battery having positive and negative electrodes respectively connected to the input/output terminals;

a threshold circuit including a Zener diode connected to the input/output terminals and establishing a threshold voltage;

a trigger circuit connected to the threshold circuit and to tie input/output terminals and generating an output signal when the charging voltage exceeds the threshold voltage;

the trigger circuit includes a potentiometer connected in series with the Zener diode across the input/output terminals and having a wiper terminal, a first transistor switch connected to the threshold circuit and including a transistor having a base connected to the potentiometer wiper and an emitter-collector junction connected across the input/output terminals and becoming conductive in response to to charging voltage exceeding the threshold level, and a second transistor switch connected to the input/output terminals and to the first transistor switch and becoming conductive in response to conduction of the first transistor switch;

a feedback circuit connected from the output of the second transistor switch to a control input of the first transistor switch and responsive to conduction of the first transistor switch for latching it in a conductive condition; and an annunciator coupled to the second transistor switch and responsive to conduction thereof to produce an indication of an over-voltage condition, the battery and the circuits and the annunciator all being disposed in the housing.

2. The battery pack of claim 1, wherein the annunciator includes an audible annunciator.

3. The battery pack of claim 1, wherein the annunciator includes a visible annunciator.

* * * * *